United States Patent [19]

Bradley, Jr. et al.

[11] Patent Number: 4,500,330
[45] Date of Patent: Feb. 19, 1985

[54] DRIFT ELIMINATOR

[75] Inventors: Wilson E. Bradley, Jr., Ellicott City, Md.; Palle Rye, Reading, Pa.

[73] Assignee: Evapco, Inc., Baltimore, Md.

[21] Appl. No.: 499,741

[22] Filed: May 31, 1983

[51] Int. Cl.³ .............................................. B01D 47/00
[52] U.S. Cl. .................................. 55/257 PV; 55/440; 261/112
[58] Field of Search ....... 55/257 R, 257 PV, 257 QV, 55/257 MP, 440, 442, 185, 186; 261/DIG. 11, 112

[56] References Cited

U.S. PATENT DOCUMENTS

| | | |
|---|---|---|
| 2,042,127 | 5/1936 | Sayles . |
| 2,596,642 | 5/1952 | Roestad . |
| 2,793,017 | 5/1957 | Lake ................................ 261/112 |
| 2,917,292 | 12/1959 | Hittrich . |
| 2,977,103 | 3/1961 | Smith et al. ...................... 261/111 |
| 3,442,494 | 5/1969 | Engalitcheff, Jr. et al. ......... 261/29 |
| 3,490,210 | 1/1970 | Horton et al. ...................... 55/440 |
| 3,540,702 | 11/1970 | Uyama ............................. 261/112 |
| 3,731,461 | 5/1973 | Hamon ........................... 55/257 PV |
| 3,733,063 | 5/1973 | Loetel et al. ...................... 261/112 |
| 3,804,389 | 4/1974 | Engalitcheff et al. ...... 261/DIG. 11 |
| 3,963,810 | 6/1976 | Holmberg et al. ................. 261/112 |
| 3,965,225 | 6/1976 | Schinner .......................... 261/79 A |
| 3,970,439 | 7/1976 | Murphy ......................... 55/440 X |
| 3,994,999 | 11/1976 | Phelps ............................. 261/159 |
| 4,014,669 | 3/1977 | Thompson et al. ............ 55/257 PV |
| 4,361,426 | 11/1982 | Carter et al. ................... 55/257 PV |

OTHER PUBLICATIONS

Landy Manufacturing, Inc., *Landy P.V.C. Eliminators*, undated.
Munters Corporation, *Prevent objectionable drift with MUNTERS Type C and D Drift Eliminators*, Dec. 1980.

*Primary Examiner*—Charles Hart
*Attorney, Agent, or Firm*—Panitch, Schwarze, Jacobs & Nadel

[57] ABSTRACT

The present invention comprises an apparatus for removing mist from a mist laden air stream comprising:

a. a plurality of stacked blades mounted in blade holding means, each blade having an inlet side and an outlet side and being stacked to allow the mist laden air stream to flow between the blades;

b. impact means disposed on a surface of each blade against which the mist and air impacts for removing mist from the air stream; and c. pressure drop reducing means disposed on the outlet side of each blade for reducing the pressure drop of the air stream across the blades.

The impact means is an integrally formed curved arch against which the mist laden air impacts to form drops and down which the drops flow. The pressure drop reducing means is an angled lip which extends along the length of the blade from the outlet edge of the blade.

19 Claims, 9 Drawing Figures

DRIFT ELIMINATOR

BACKGROUND OF THE INVENTION

The present invention is directed generally to drift eliminators for removing mist from gas stream. Specifically, the invention is directed to an improved drift eliminator for removing water droplets from a forced airstream in evaporative cooling equipment, for example cooling towers, evaporative condensors, closed circuit fluid coolers, etc.

Drift eliminators, also referred to as mist eliminators, are known. For example, U.S. Pat. No. 3,442,494 illustrates a drift eliminator arranged at the exhaust end of an evaporative heat exchanger to remove water droplets from the exiting air stream. Such prior art drift eliminators are manufactured from either metal or a combination of thermoformed polymeric plastic material and metal. A problem with metal drift eliminators is that the metal corrodes and rusts. The corrosion and rust reduce the life of the eliminator and also deposit on the eliminator blades, significantly reducing the operating efficiency of the eliminator. Other problems with metal drift eliminators are that they are heavy and expensive, and they create a relatively high air pressure drop across the eliminator.

Plastic or PVC drift eliminators overcome many of the problems exhibited by metal drift eliminators. Plastic drift eliminators do not rust or corrode, and are lighter and less expensive than metal eliminators.

A problem with known plastic drift eliminators is that they are manufactured from thick extruded parts and, although lighter than their metal counterparts, are nonetheless relatively heavy and expensive compared to the drift eliminators of the present invention. Moreover, known plastic drift eliminators utilize metal frame members, such as metal rods and fasteners to fasten the blades together and to provide structural integrity. The metal rods and fasteners corrode and rust and therefore these plastic eliminators suffer from many of the same problems as metal drift eliminators. The plastic eliminators also are subject to a relatively high pressure drop.

The present invention provides a plastic drift eliminator preferably made of polymeric plastic which is strong, inexpensive, and light, on the order of about 85% lighter than metal drift eliminators and about 33% to 65% lighter than known prior art plastic drift eliminators. For example, for a typical size eliminator, say one having plan area of 72 inches by 20 inches, the present invention would weigh about 11 pounds, compared with about 87 pounds for a known steel eliminator and about 16 to 31 pounds for known plastic eliminators. The light weight is important for maintenance purposes, shipping, and the like.

The strength to weight ratio of the drift eliminators of the present invention is very good, due to their construction. The drift eliminators of the present invention do not require any metal framing members, such as fasteners or rods. The present invention comprises a high efficiency drift eliminator which has blades having a structure so as to operate with a relatively low pressure drop across the eliminator.

SUMMARY OF THE INVENTION

The present invention comprises in its broadest form an apparatus for removing mist from a mist laden air stream comprising:

a. a plurality of stacked blades mounted in blade holding means, each blade having an inlet side and an outlet side and being stacked to allow the mist laden air stream to flow between the blades;

b. impact means disposed on a surface of each blade against which the mist and air impacts for removing mist from the air stream; and c. pressure drop reducing means disposed on the outlet side of each blade for reducing the pressure drop of the air stream across the blades.

The impact means is an integrally formed curved arch against which the mist laden air impacts to form drops and down which the drops flow toward a reservoir. The pressure drop reducing means is an angled lip which extends along the length of the blade from the outlet edge of the blade.

More specifically, the present invention comprises a polymeric plastic mist eliminator for reducing the mist content of a mist laden air stream comprising:

a. a plurality of polymeric plastic blades stacked in a plane, the blades having an inlet side and an outlet side, the plane of the stack of blades being substantially normal to the direction of flow of the entering air stream, wherein each blade comprises:

i. a curved portion extending along the length of the blade and beginning at a location adjacent the inlet side and terminating at a location adjacent the outlet side;

ii. a flat base section disposed adjacent to the arched portion of the blade on the outlet side thereof, the base section lying in a plane substantially parallel to the plane of the blade and having an edge adjacent the outlet side;

iii. a longitudinal first lip perpendicularly disposed along the edge of the base section extending in a direction toward the crest of the arch;

iv. a longitudinal second lip perpendicularly disposed along the edge of the first lip extending in a direction away from the inlet side of the blade;

v. a plurality of integral feet molded into the blade at locations adjacent to the inlet side and outlet side; and vi. a plurality of integral mating pads molded into the surface of the blade at locations adjacent the feet and positioned to mate with the feet on an adjacent blade in the stack; and b. a pair of molded plastic end caps adapted to receive the ends of the blades in the stack, each end cap comprising:

i. a body portion having formed therein a plurality of arched grooves equal in number to the number of blades in the stack, the grooves having a curvature substantially identical to curvature of the arched portion of the blades;

ii. a plurality of protrusions between adjacent grooves, each protrusion having sides sloping toward the adjacent grooves; and iii. a pair of longitudinally disposed opposed channels, either channel being adapted to receive the ends of the first and second lips of the blades;

whereby a desired number of blades are stacked, the feet of one blade are bonded to the mating pads of the adjacent blade in the stack and the inlet side, outlet side and arched portions of the blades are spaced apart at intervals determined substantially by the dimensions of the feet and mating pads, and the ends of the blades in the stack are bonded in respective grooves in the end caps.

Another aspect of the present invention includes novel end caps which form a strengthening structure for the stack of blades for the drift eliminator. Each end cap is adapted to support one of two ends of a stack of blades of a drift eliminator and each end cap comprises a body portion having formed therein a plurality of grooves extending generally transversely across the body, the grooves having a shape generally the same as the cross-sectional shape of the blades, a plurality of protrusions between adjacent grooves, each protrusion having sides sloping toward the adjacent grooves, and a pair of longitudinally disposed opposed channels, either channel being adapted to receive either end of the stack of blades.

The assembled eliminator is positioned over the cooling tower, heat exchanger, etc. so that the first lip directs the exhaust air away from the fresh air intake of the cooling tower, heat exchanger, etc. As the mist laden air flows over the blades, liquid droplets of the mist collect on the arched surfaces and run in a direction opposite to the air flow into the region of the equipment where the water is sprayed onto the wet decks.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
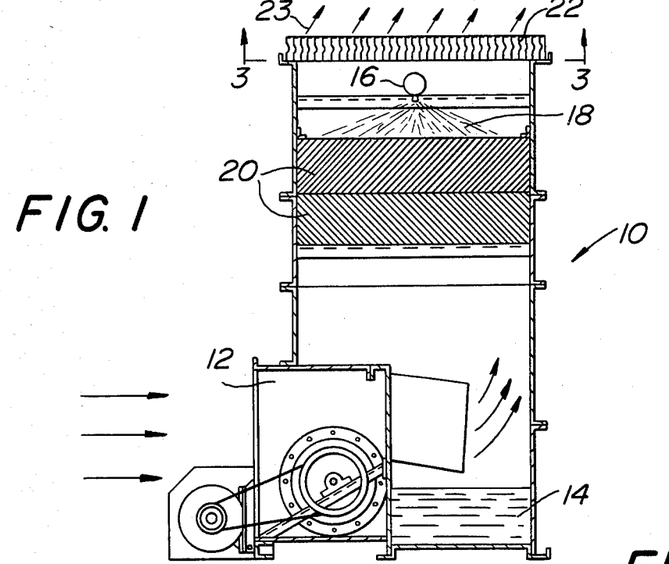
FIG. 1 is a sectional view of an evaporative heat exchanger having a drift eliminator positioned over the exhaust port thereof.

With reference to the drawings, wherein like numerals represent like elements, there is shown in FIG. 1 an evaporative heat exchanger 10 having a drift eliminator 22 positioned over the exhaust port thereof. It should be understood that the heat exchanger 10 does not form a part of the present invention. It is illustrated to show a typical use of the drift eliminator of the present invention.

As is conventional, the heat exchanger 10 comprises a fan section 12 which draws fresh air through an intake located toward the left hand portion of FIG. 1 and forces the air over a plurality of wet decks 20. A fluid to be cooled, such as heated water, is supplied to a manifold 16 which provides a water spray 18 over the wet decks 20. The water pours over the wet decks in a direction opposite to flow of the air from fan section 12. As the air and water meet, heat is transferred from the higher temperature water to the lower temperature air through the evaporative cooling process, causing the temperature of the water to decrease and the wet bulb temperature of the air to increase. The airstream picks up water droplets as the air is forced through the heat exchanger 10 and the humidity of the airstream increases. The drift eliminator 22 removes the water droplets from the airstream. As will be explained hereinafter in detail, the drift eliminator 22 also directs the exhausted air away from fresh air intake of heat exchanger 10, as shown by the arrows 23.

Figures 2, 9:
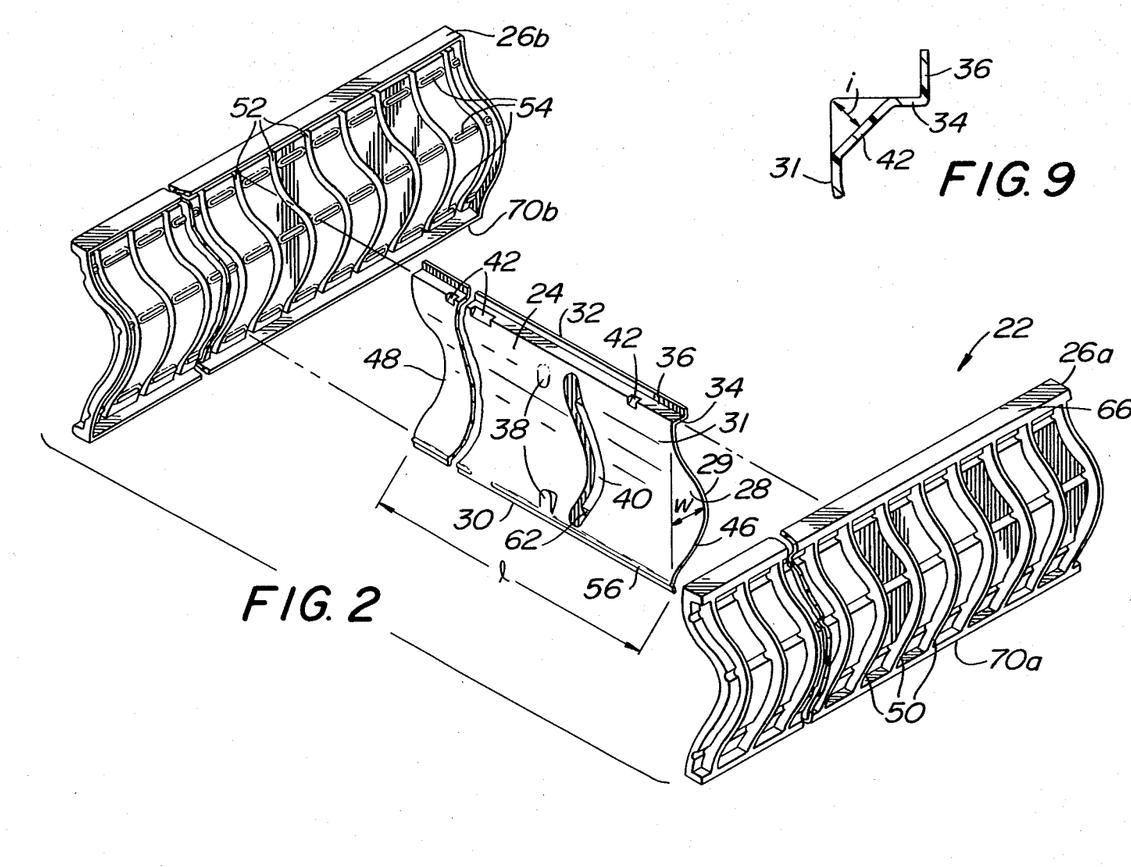
FIG. 2 is an exploded perspective view of the drift eliminator and illustrates the cooperation between one of the blades and the pair of end caps.
FIG. 9 is a partial cross-section taken along line 9—9 of FIG. 5 and illustrates the construction of the gussets.

Referring now to FIG. 2, details of the drift eliminator 22 will be explained.

The drift eliminator 22 comprises a plurality of blades or vanes 24 (only one blade 24 is shown in FIG. 2) and a pair of end caps 26a, 26b. As will be explained, a plurality of blades 24 are arranged, preferably in a common plane, and have ends or edges 46 and 48 which are received by the end caps 26a, 26b. Each of the blades 24 and the end caps 26a, 26b are manufactured from a polymeric plastic material, for example, polyvinylchloride (PVC), by any known process, such as injection molding or preferbly, vacuum thermoforming. Other suitable polymeric materials may be used, such as chlorinated PVC, acrylonitrilebutadiene-styrene, polypropylene, etc., depending on the environment to which the drift eliminator will be subjected. Each of the blades 24 is substantially identical in all respects except as will be herein explained. Therefore, only the construction details of one blade 24 will be explained.

Blade 24 has an inlet side 30 and an outlet side 32. The height h (FIG. 5) of the blade 24 is defined by the distance between the extreme edge of the inlet side 30 and the extreme edge of the outlet side 32. Blade 24 also has a length l (FIG. 2) defined by the distance between end edges 46 and 48. The length l is greater than the height h.

The blade 24 is molded so that there is a curved arched portion 28 between the inlet and the outlet sides. The arched section extends along the entire length l of the blade 24. The convex surface of the curved arched portion forms the primary impact surface against which the mist laden gas impacts and on which drops form. It is important that the arch be curved so the drops which form on it flow downward in a continuous manner without collecting at any location of the arch which may adversely affect the flow of the gas stream.

Figure 7:
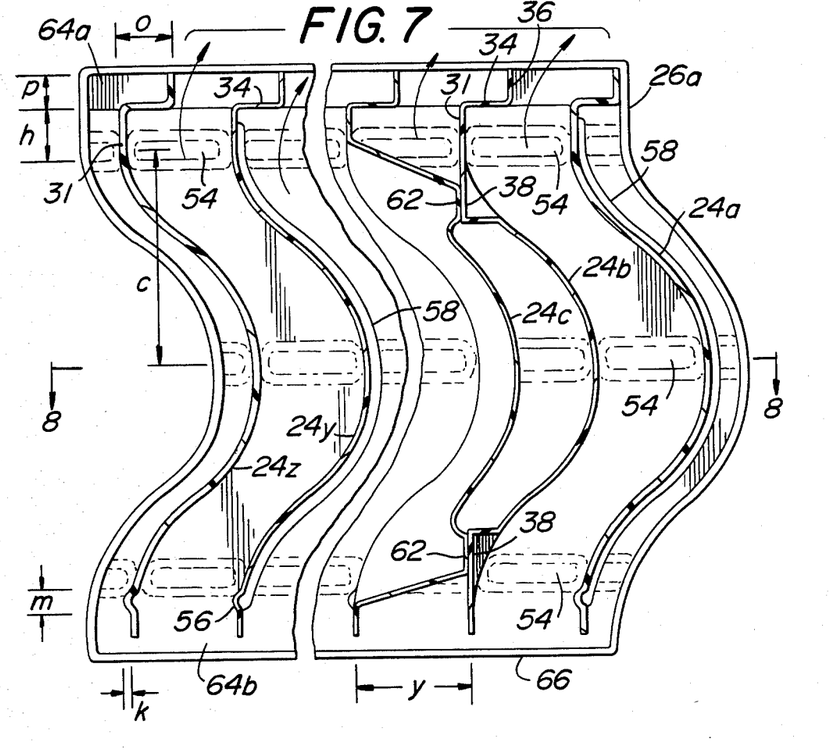
FIG. 7 is a cross-section taken along line 7—7 of FIG. 3.

The arched portion 28 is offset with respect to the longitudinal center line of blade 24 so that the crest 29 of arch 28 is closer to the inlet side 30 than to the outlet side 32. In a preferred embodiment, the height h is approximately $4\frac{3}{8}$ inches, the crest 29 occurs at approximately 2 inches from the edge of the inlet side 30, and the width w of blade 24 is approximately $1\frac{1}{4}$ inches from the surface of a base section 31 (FIGS. 2 and 7). The base section 31 is a substantially flat section of the blade located adjacent the outlet side 32 and is provided to compensate for the offset placement of arch 29 from the longitudinal centerline of the blade 24. In a preferred embodiment, the height n of base section 31 is approximately $\frac{1}{2}$ inch (FIG. 7).

At a location inwardly adjacent the edge of the inlet side 30 is a longitudinal stiffening rib 56 (FIGS. 2 and 7).

Figure 6:
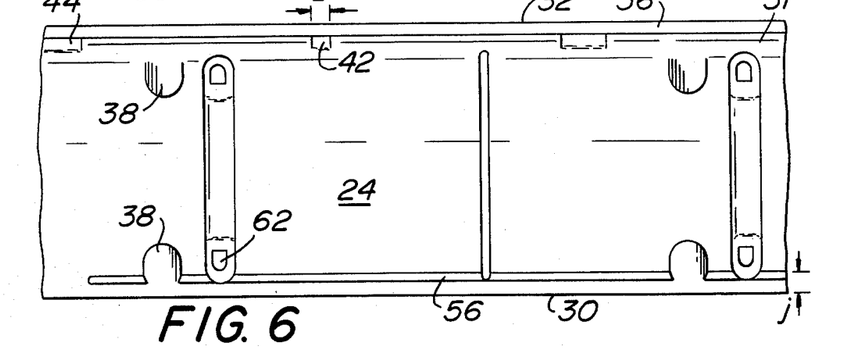
FIG. 6 is a partial elevation view taken from the left hand side of FIG. 1 of one of the blades of the drift eliminator according to the invention.

The rib 56 is molded into the surface of the blade 24 so that the rib 56 protrudes in a direction opposite to the protrusion of crest 29. The longitudinal rib 56 may extend from half to full length of the blade 24 and provides strength to the inlet edge of the blade to prevent the edge of the blade from twisting. Discontinuities in rib 56 occur where rib 56 intersects glue pads 38, feet 62 and ribs 58. In a preferred embodiment, the longitudinal rib 56 is offset by a distance j (FIG. 6) from the extreme edge of inlet side 30 by approximately ¼ inch. The preferred width k of rib 56 is about 1/32 inch (FIG. 7), but may extend to about ⅛ inch. The height m (FIG. 7) of rib 56 may vary from about 1/16 inch to about ¼ inch, however a width of about 3/32 inch is preferred.

A first lip 34 is formed along the edge of base section 31, preferably by molding. The first lip 34 extends along the length l of blade 24 and may be substantially perpendicular to the base section 31. The lip 34 extends from the base section 31 in the same direction as the crest 29. The functions of first lip 34 are to accelerate and direct the airstream at the same time acting as an impact surface to remove remaining mist from the airstream. These functions are described further hereinafter.

A plurality of gussets 42 (FIGS. 2, 5 and 9) are molded into the surface of the blade 24 to prevent the first lip 34 from bending. The gussets 42 extend at an angle of approximately 45° with respect to the face of the first lip 34, and also with respect to the base section 31.

A second lip 36 is formed, preferably by molding, along the edge of the first lip 34 as best shown in FIGS. 2, 7 and 9. The second lip 36 extends along the length l of the blade and may be substantially perpendicular to the first lip 34 such that the plane of the second lip 36 and the plane of the base section 31 may be substantially parallel. Second lip 36 provides the unexpected function of decreasing the drop of pressure of the air exiting the eliminator compared to the pressure of the mist laden air entering the eliminator. This function, its importance, and other functions of the second lip 36 will be set forth in more detail hereinafter.

The presently preferred angle between the base section 31 and the first lip 34 and the angle between the first lip 34 and the second lip 36 are 90°. However, the angles need not be exactly 90°, but may be generally perpendicular and varied to any other angle within about ±15° which provides the efficient air flow and direction qualities of the present invention.

In a preferred embodiment, the first lip 34 extends a distance o approximately ⅜ inch from the surface of the base section, and the second lip 36 extends a distance p at least 1/32 inch to about ¾ inch, and preferably about 3/16 inch, from the first lip 34. See FIG. 7.

Each blade 24 further contains a plurality of glue pads 38 (FIGS. 2 and 5–7), a plurality of feet 62 (FIGS. 2, 3 and 7), a plurality of first ribs 40 and a plurality of second ribs 58 (FIGS. 3 and 5). Depending on the length of the blades and the size of the blade forming equipment, each blade 24 also may have a number of seams 60 (FIGS. 3 and 5).

The glue pads 38 are arranged in pairs at uniform distances along the blade 24 (FIGS. 5 and 6). Corresponding ones of each pair of glue pads 38 are disposed on opposite sides of the centerline of the blade, as shown. One of the glue pads in each pair is located adjacent the edge of the inlet side 30 and intersects the longitudinal rib 56. The corresponding glue pad of the pair is located adjacent the edge of the base section 31. The glue pads are molded into the surface of the blade during the forming process and protrude through the blade as shown in FIG. 2.

Adjacent to and aligned longitudinally with each pair of glue pads 38 is a pair of feet 62. The feet 62 are molded into the surface of the blade and protrude from the blade in a direction toward the crest 29. Corresponding ones of each pair of feet 62 are disposed on opposite sides of the centerline of the blade, as shown. One of the feet in each pair is located adjacent the edge of the inlet side 30 and intersects the longitudinal rib 56. The corresponding foot in the pair is located adjacent the edge of the base section 31. As can be seen, pairs of feet 62 and glue pads 38 have an aligned, juxtaposed relationship. The feet 62 and glue pads 38 are arranged so that feet 62 of one blade align with and may be bonded to the glue pads 38 of the next adjacent blade to facilitate a horizontally stacked arrangement of blades.

Referring to FIG. 3, the drift eliminator as viewed from the inlet side is illustrated. It should be understood that, although the blades are labelled 24*a* through 24*z*, any desired number of blades may be utilized. The number of blades utilized will be determined by the size of the opening of the heat exchanger, the amount of water impingement and velocity of air passing through the drift eliminator and the other design parameters of the system.

As illustrated, the blades 24*a* through 24*z* are stacked in overlapping relationship. The cavity defined by the arched portion 28 of each blade receives the arched portion 28 of the next adjacent blade. Thus, the arched portion of the blade 28*b* is partially received by the cavity defined by the arched portion in blade 28*a*, the arched portion of blade 28*c* is partially received by the cavity defined by the arched portion in blade 28*b*, etc.

As mentioned, stacking of the blades is facilitated by the juxtaposed relationship of the feet 62 and glue pads 38 on each blade, as best illustrated in FIGS. 5 and 6. Successive blades in the stack are formed so that feet 62 of one blade mate with and are bonded to glue pads 38 of the next adjacent blade. For example, as illustrated in FIG. 7, a blade 24*c* has a pair of feet 62 which mate with the glue pads 38 on the adjacent blade 24*b*. As illustrated in FIG. 3, the placement of the feet 62 are glue pads 38 alternates with each adjacent blade. On blade 24*a*, feet 62 are on the left side of adjacent glue pads 38; on blade 24*b*, the placement of the feet 62 and glue pads 38 are reversed with respect to blade 24*a*, so that feet 62 are on the right side of glue pads 38. Thus, feet 62 on blade 24*b* are aligned and mate with glue pads 38 on blade 24*a*. Blade 24*c* is identical to blade 24*a*, and a blade 24*d* (not shown) is identical to blade 24*b*. In this manner, the feet 62 mate with the glue pads 38 of successive blades in the stack, allowing any desired number of blades to be stacked. The longitudinal distance between the glue pads 38 equals the longitudinal distance between the feet 62 in all blades.

In a preferred embodiment, the distance d (FIG. 5) between pairs of feet, and also between pairs of glue pads, is approximately 9 inches but may vary from about 4 inches to about 18 inches depending upon the thickness and strength of the blades. The distance x (FIG. 5) between the feet and also between the glue pads is approximately 3¼ inches and the distance y (FIGS. 3 and 7) from the feet 62 to the surface of the blade 24 is approximately 31/32 inch. In this arrangement, the distance between succeeding blades is approximately 31/32 inch before bonding. However, the distance y may vary from about ½ inch to about 1⅝ inch, in which case the blade spacing will vary accordingly.

Figure 3:
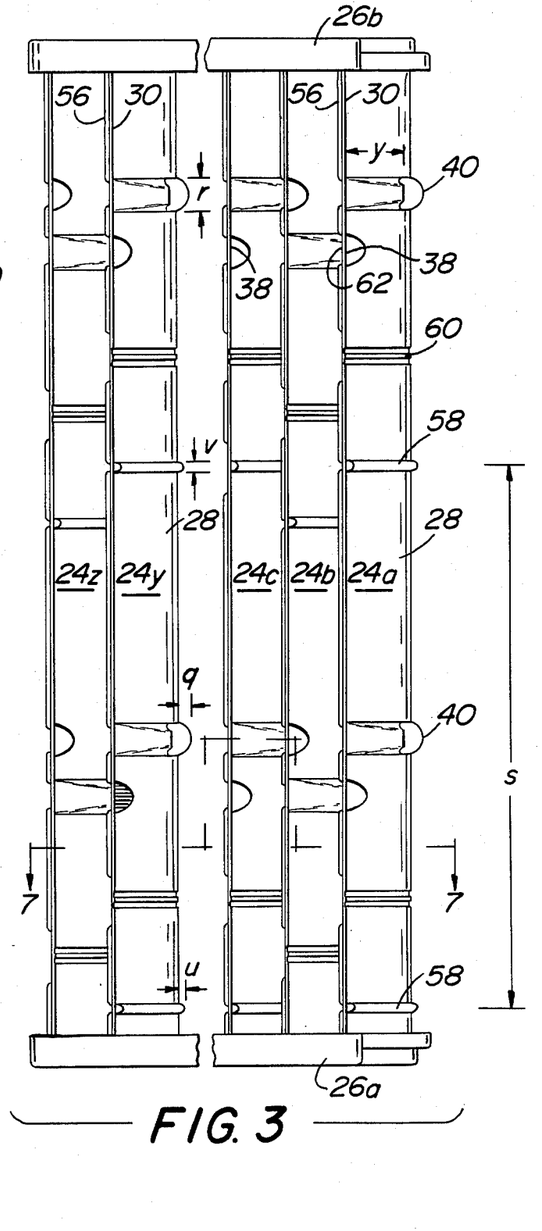
FIG. 3 is a plan view of the drift eliminator as viewed along line 3—3 of FIG. 1.
Figure 5:
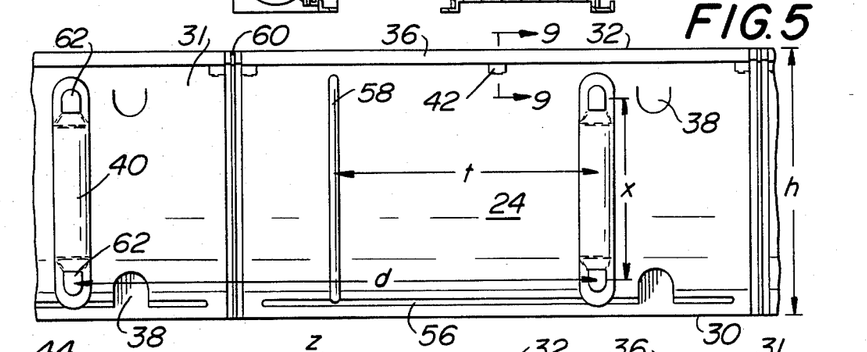
FIG. 5 is a partial elevation view taken from the right hand side of FIG. 1 of one of the blades of the drift eliminator according to the invention.

As best illustrated in FIGS. 3 and 5, there are a plurality of first ribs 40 extending transversely over the surface of the blade 24 between each pair of feet 62. The first ribs 40 are molded into the surface of the blade and project from the surface of the blade. In a preferred embodiment, the first ribs project a distance q of approximately 3/16 inch beyond the surface of the blade 24 (FIG. 3). The dimension r (FIG. 3) of the first ribs may vary from about ⅛ inch to about 1¼ inch, but a width of about 7/16 inch is preferred presently.

Each blade 24 also contains a number of second ribs 58 spaced along the length of the blade (FIGS. 3 and 5). Each rib 58 extends transversely over the surface of the blade. Each rib 58 extends from a location adjacent the edge of the inlet side 30, over the arched portion and terminates adjacent the edge of the base section 31. In a preferred embodiment, the distance s (FIG. 3) between the second ribs 58 is approximately 9 inches, but may vary from about 4 inches to about 18 inches depending upon the thickness and strength of the blades. It is important that the distance t (FIG. 5) between adjacent first ribs 40 and second ribs 58 be at least about 1½ inches so as not to interfere with the flow of air or other fluid, but a distance of about 4½ inches is preferred. The dimension u (FIG. 3) of each rib 58 may vary from about 1/16 inch to about ⅜ inch, but a dimension of about 5/32 inch is preferred. The dimension v of each rib 58 may vary from about 1/16 inch to about 1/2 inch, but a dimension of about ⅛ inch is preferred.

In combination, the first and second ribs provide rigidity and structural integrity to the blades 24, and help prevent the arched portion from collapsing or the blade from deforming when the blades are stacked during use, shipping or storage. The first and second ribs also provide channels to guide the water droplets as they roll along the blade surfaces and help reduce the turbulence of the airstream flowing through the eliminator.

As seen in FIGS. 3 and 5, there are a plurality of seams 60 on each blade 24. The seams 60 are formed during the manufacturing process and may not be necessary if the manufacturing equipment is large enough to make a blade of the desired dimensions in one piece. Note that there is one pair of glue pads 38, one pair of feet 62, a first rib 40 and a second rib 58 between each pair of seams 60.

Returning to FIG. 2, the end caps will be explained in detail. The end caps form a strengthening structure for the blades. Each of the end caps 26a and 26b contains a plurality of arched grooves 50, 52 extending generally transversely across the body of the end cap. The arched grooves 50, 52 are molded into the end caps 26a, 26b and are adapted to receive the end edges 46, 48 of each of the blades 24. The grooves have a shape generally the same as the cross-sectional shape of the blades. During assembly, the edges 46, 48 of blades 24 are inserted into their respective grooves 50, 52. A suitable chemical bonding agent is applied between the mating surfaces of feet 62 and glue pads 38, and also the edges 46, 48 and grooves 50, 52. As explained hereinafter, the spacing between successive grooves 50, 52 in each of the end caps 26a, 26b is such that the grooves 50, 52 properly align with the edges 46, 48 of the blades 24 after the feet 62 of one blade are bonded to the glue pads 38 of an adjacent blade.

A preferred solvent-type bonding agent comprises a mixture of toluene, methyl ethyl ketone and chlorinated polyvinylchloride resin. A nonsolvent latex base adhesive may also be used. Other suitable solvent-type adhesives and non-solvent-type adhesives may be used.

It has been found that when a solvent-type bonding agent is applied, some shrinkage of the plastic occurs. Specifically, when the feet 62 and glue pads 38 are bonded together by means of a solvent-type bonding agent, shrinkage occurs and causes the distance between successive blades to be less than the distance between the blades before bonding occurred. It is necessary to compensate for the shrinkage by making the dimension y of the feet, before bonding, slightly greater than the desired distance between the blades after bonding. Thus, the distance between successive grooves 50, 52 must be such that the edges 46, 48 of blades 24 will mate with the grooves 50, 52 after bonding of the feet 62 and glue pads 12 occurs. This arrangement is shown in enlarged detail in FIG. 4.

Figure 4:
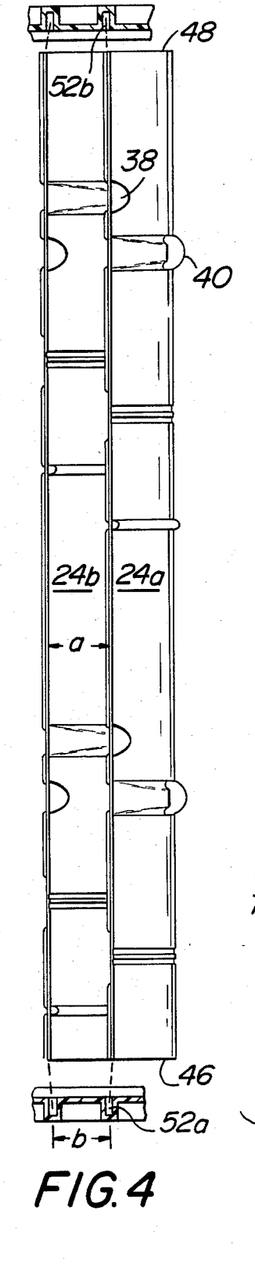
FIG. 4 is a partial plan view of the blades and a partial sectional view of the end caps and illustrates the cooperation between the blades and the end caps before bonding of the components.

In FIG. 4, the distance between successive grooves in end cap 26b is labeled b. The edges 48 of blades 24a and 24b fit into grooves 52a and 52b respectively. The distance a between blades 24a and 24b, before bonding occurs, is greater than the distance b between grooves 52a and 52b. However, as the solvent-type bonding agent is applied and the feet and glue pads are bonded together, shrinkage occurs. After shrinkage, the distance a equals the distance b and the end caps fit properly over the edges of the blades.

As a practical matter, the drift eliminator may be constructed from the parts by standing the stack of blades on end (e.g., rotating the stack 90° from the position illustrated in FIG. 1) and placing a weight on top of the stack. This assures a good bond between the blades.

Depending on the material used to make the blades and the particular solvent-type bonding agent used to bond the blades, it is believed that if the distance a before bonding is approximately 0.005 to 0.075 inch greater than the desired distance b after bonding, the blades will fit properly into the end caps.

The end caps 26a and 26b each have a pair of channels 64a and 64b. The channels 64a and 64b are identical. As illustrated in FIG. 7, the channels 64a receives the first lip 34 and the second lip 36 of each blade 24. However, the end caps are universally constructed such that the blades 24 can be inserted with first lip 34 and the second lip 36 housed in either channel 64a or 64b.

Figure 8:
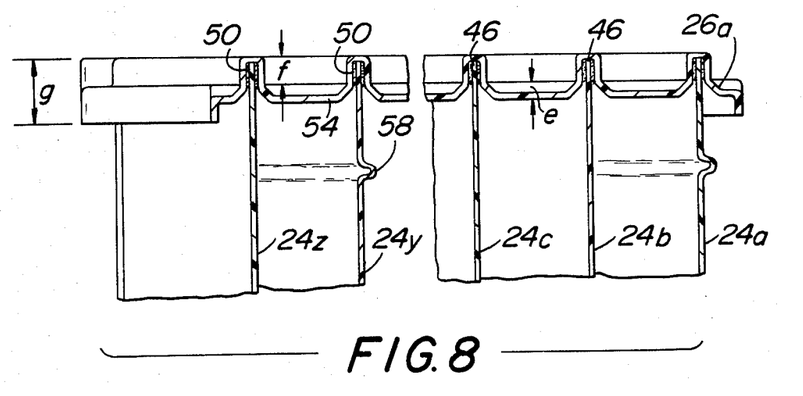
FIG. 8 is a cross-section taken along line 8—8 of FIG. 7.

Further details of the end caps are illustrated in FIG. 8. There are a plurality of protrusions 54 between each of the grooves 50, 52. The protrusions 54 are molded into the face of the end cap so that the ends of the protrusions 54 adjacent the grooves slope downwardly toward the grooves. In this manner, when a blade 24 is inserted in endcap 26, the protrusions 54 will locate the blade in the groove.

In a preferred embodiment, there are three protrusions 54 between adjacent grooves (FIG. 7). The distance c (FIG. 7) between each of the protrusions 54 is approximately 1 13/16 inches and the dimension e of each protrusion is approximately ⅛ inch. The preferred depth f (FIG. 8) of each groove is approximately ¼ inch.

Each of the end caps has a flange 66 extending around the entire perimeter of the end cap. The flange is preferably perpendicular to the plane of the end cap to strengthen it and projects in the same direction as the protrusions 54. In a preferred embodiment, the overall dimension g (FIG. 8) of the flange is about 9/16 inch.

Turning again to FIG. 8, details of the stacking arrangement of the blades are illustrated. As seen therein, the edges 46 of the blades 24a–24z are received by the end cap 26a. Locating protrusions 54 between each of the grooves 50 in end cap 26a are also shown.

The blades preferably are arranged in a common plane so that the inlet sides 30 of all blades are aligned on one side and the outlet sides 32 of all blades are aligned on the other side (FIGS. 1 and 7).

FIG. 9 illustrates the details of gussets 42. As previously explained, gussets 42 provide strength to the first lip 34 to prevent it from flexing as the airstream impinges upon it. As shown in FIG. 9, gussets 42 are molded into the surface of the blade and are at an angle of approximately 45° with respect to the first lip 34, and also with respect to the base section 31. In a preferred embodiment, the maximum depth i of the gusset 42 is about ⅛ inch, but may vary from about 1/16 inch to about ¼ inch. The width z (FIG. 6) of the gussets may vary from about ⅛ inch, but a width of about ¼ inch to about ¾ inch is preferred. The distance between gussets 42 may vary from 2 inches to 18 inches, but a spacing of about 4½ inches is preferred.

In a presently preferred embodiment the blades and end caps are constructed of PVC material having a thickness ranging from about 0.010 inch to about 0.060 inch. The first and last blades in the stack are constructed from a heavier gauge material than the remainder of the blades to improve the rigidity of the stacked arrangement. Preferably, the interior blades have a thickness of about 0.025 inch. The first and last blades have a thickness of about 0.035 inch. The end caps have a preferred thickness of about 0.045 inch, and are made of the heaviest guage material to act as a strengthening support structure for the stack of blades.

Because the first and second blades and the end caps are made of relatively thick material, the drift eliminator of the present invention is a rather rigid structure with good strength characteristics. Because the rest of the blades are made of relatively thin material, the entire drift eliminator is light in weight so that it is easy to maintain the equipment using the drift eliminators and it is less expensive to ship the drift eliminators. Overall, they have a relatively high strength to weight ratio when compared to known prior art drift eliminators.

The operation of the drift eliminator will now be explained. The drift eliminator 22 is arranged over the exhaust port of a heat exchanger, cooling tower, etc. so that a mist laden airstream enters the mist eliminator through the inlet side 30 and exits through the outlet side 32. As the mist laden airstream passes through the plurality of blades, the arched portion changes the direction and velocity of the airstream, causing the water droplets to impact upon the arched portion and be separated from the air stream. The water droplets adhere to the surface of the blade, run down the arched portion of the blades in a direction opposite to the air flow and re-enter the water spray area 18. A reservoir 14 (FIG. 1) may be provided to collect the water falling from wet decks 20. The ribs 40 and 58 increase the strength and structural integrity of each of the blades and provide channels for the water droplets. It has been found that the ribs 40 and 58 also act to channel the airstream and reduce the turbulence of the air flowing through the eliminator, therefore lowering the operating pressure drop across the eliminator.

As the airstream passes over the longitudinal ribs 56, the water droplets fill the concave side and run over the convex side, presenting a streamline shape to the entering airstream, thus eliminating the turbulence and losses which would otherwise be present.

As the airstream impacts upon the first lip 34, remaining droplets of water are trapped and stripped from the airstream. The lip 34 also causes the airstream to accelerate (because of the reduced spacing) and turn slightly as it exits the drift eliminator. The velocity of the air is increased by approximately 50% and turned in a direction of approximately 30° from the vertical. As previously mentioned, the change in direction is desirable to prevent re-entry of the exhaust air at the fresh air intake of the heat exchanger, cooling tower, etc. However, the acceleration and direction shift normally is achieved at the expense of a higher pressure drop. The second lip 36 compensates for this pressure drop.

It has been found that the second lip 36, in addition to providing stiffness and stability to the outlet side of the blade, unexpectedly greatly reduces the turbulence of the airstream at the edge of the blade, and lowers the operating pressure drop across the eliminator by approximately 10% compared to PVC drift eliminators which do not have the second lip 36. Compared with prior art metal drift eliminators, the present invention lowers the pressure drop by about 30%. A pressure drop of 10% is very substantial in that it provides improved thermal performance and higher air velocities at lower fan horsepower and consequent lower operating costs. This substantially reduced pressure drop is obtained as a result of second lip 36 without significantly adversely affecting the desirable directed air discharge and acceleration features provided by the eliminator.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for removing mist from a mist laden air stream comprising:
   a. a plurality of stacked blades mounted in blade holding means, each blade having an inlet side and an outlet side and being stacked to allow the mist laden air stream to flow between the blades;
   b. impact means disposed on a surface of each blade against which the mist and air impacts for removing mist from the air stream;
   c. a combined air stream accelerating and directing means and remnant mist removing means disposed on the outlet side of each blade; and
   d. pressure drop reducing means disposed on the outlet side of each blade for reducing the pressure drop of the air stream across the blades.

2. Apparatus according to claim 1, the outlet side of each blade having a base section lying in a plane substantially perpendicular to the plane containing the stack of blades, the base section having an edge adjacent the outlet side, the combined air stream accelerating and directing means and remnant mist removing means comprising a first lip disposed along the edge of the base section, the first lip being generally perpendicular to the base section and extending from the base section on the same surface of the blade as the impact means, the pressure drop reducing means comprising a second lip disposed along the edge of the first lip, the second lip being generally perpendicular to the first lip and extending in a direction away from the inlet side of the blade.

3. Apparatus according to claim 2 made of polymeric plastic material and further comprising combination blade strengthening means and air stream turbulence reducing means disposed on the surface of each blade containing the impact means.

4. Apparatus according to claim 3 further comprising integral support and spacing means on each blade for supporting and spacing the stacked blades at predetermined distances from each other.

5. Apparatus according to claim 4 wherein the blade holding means comprises a pair of end caps for receiving ends of the blades and for strengthening the stack of blades.

6. Apparatus according to claim 5 wherein the impact means comprises a curved arched portion extending along the length of the blade disposed between the inlet side and the outlet side.

7. Apparatus according to claim 6 wherein the blades are stacked in a common plane, wherein the base section is substantially flat and is disposed adjacent to the arched portion, and wherein the first lip extends from the base section on the same surface of the blade as the crest of the arched portion.

8. Apparatus according to claim 7 wherein the first lip is perpendicular to the base section and the second lip is perpendicular to the first lip.

9. Apparatus according to claim 7 wherein the integral support and spacing means comprises a plurality of feet and mating pads arranged in an aligned juxtaposed relationship, the feet projecting in a direction perpendicular to the plane containing the blade and toward the crest of the arch, the mating pads receiving the feet from the adjacent blade in the stack for bonding thereto, the feet and mating pads being an integral portion of the blade.

10. Apparatus according to claim 9 wherein the combination blade strengthening means and air stream turbulence reducing means comprises a plurality of spaced ribs integral with and transverse to the length of the blade, each rib extending from a location adjacent the inlet side, over the arched portion of the blade and terminating at a location adjacent to the outlet side.

11. Apparatus according to claim 10 wherein each blade further comprises a longitudinal rib extending along the length of and inwardly of the edge of the inlet side of the blade, the longitudinal rib protruding from the blade surface.

12. Apparatus according to claim 11 wherein the end cap means for receiving ends of the blades and for strengthening the stack of blades comprises a pair of end caps adapted to receive the ends of the stack of blades, each end cap comprising a plurality of arcuate grooves equal in number to the number of blades in the stack, the grooves having a curvature substantially identical to the curvature of the arched portion of the blades, locating means situated between adjacent grooves on each end cap for locating the end of a blade in an appropriate groove, and channel means for receiving the first and second lips of each blade.

13. Apparatus according to claim 12 wherein the locating means comprises a plurality of protrusions in the end caps between adjacent grooves, the protrusions having sloping edges to guide the end of the blade into the appropriate groove.

14. Apparatus according to claim 1 wherein the end caps and blades are made of polyvinylchloride.

15. A polymeric plastic mist eliminator for reducing the mist content of a mist laden air stream comprising:

a. a plurality of polymeric plastic blades stacked in a plane, the blades having an inlet side and an outlet side, the plane of the stack of blades being substantially normal to the direction of flow of the entering air stream, wherein each blade comprises:
  i. a curved portion extending along the length of the blade and beginning at a location adjacent the inlet side and terminating at a location adjacent the outlet side;
  ii. a flat base section disposed adjacent to the arched portion of the blade on the outlet side thereof, the base section lying in a plane substantially parallel to the plane of the blade and having an edge adjacent the outlet side;
  iii. a longitudinal first lip perpendicularly disposed along the edge of the base section extending in a direction toward the crest of the arched portion;
  iv. a longitudinal second lip perpendicularly disposed along the edge of the first lip extending in a direction away from the inlet side of the blade;
  v. a plurality of integral feet molded into the blade at locations adjacent to the inlet side and outlet side; and
  vi. a plurality of integral mating pads molded into the surface of the blade at locations adjacent the feet and positioned to mate with the feet on an adjacent blade in the stack; and
b. a pair of molded polymeric plastic end caps adapted to receive the ends of the blades in the stack, each end cap comprising:
  i. a body portion having formed therein a plurality of arched grooves equal in number to the number of blades in the stack, the grooves having a curvature substantially identical to curvature of the arched portion of the blades;
  ii. a plurality of protrusions between adjacent grooves, each protrusion having sides sloping toward the adjacent grooves; and
  iii. a pair of longitudinally disposed opposed channels, either channel being adapted to receive the ends of the first and second lips of the blades;
whereby a desired number of blades are stacked, the feet of one blade are bonded to the mating pads of the adjacent blade in the stack and the inlet side, outlet side and arched portions of the blades are spaced apart at intervals determined substantially by the dimensions of the feet and mating pads, and the ends of the blades in the stack are bonded in respective grooves in the end caps.

16. A mist eliminator according to claim 15 wherein each blade further comprises a plurality of first and second strengthening ribs transversely disposed over the arched portion and extending from the inlet side to the outlet side, each first strengthening rib extending between opposing feet and each second rib being positioned approximately midway between adjacent ones of first ribs.

17. A mist eliminator according to claim 16 wherein each blade further comprises a longitudinal strengthening rib extending along the length of and inwardly of the edge of the inlet side of the blade, the longitudinal rib protruding in a direction opposite the crest of the arch.

18. A mist eliminator according to claim 17 made of polyvinylchloride.

19. An end cap adapted to support one of two ends of a stack of blades of a drift eliminator, the end cap comprising a body portion having formed therein a plurality of grooves extending generally transversely across the body, the grooves having an end wall and side walls of a shape generally the same as the cross sectional shape of the blades, a plurality of protrusions between adjacent grooves, each protrusion having sides sloping toward the adjacent grooves, and a pair of longitudinally disposed opposed channels, either channel being adapted to receive either end of the stack of blades.

* * * * *